United States Patent [19]
Ford et al.

[11] Patent Number: 4,857,493
[45] Date of Patent: Aug. 15, 1989

[54] POLYMER LATEXES CONTAINING METAL IONS AND COMPLEXES

[76] Inventors: Warren T. Ford, 217 S. Ridge, Stillwater, Okla. 74078; Rama S. Chandran, 2 Aquarius Ct., Apt. 7, Somerville, N.J. 08876-4910; Mahmoud Hassanein, 101-5 N. University Pl., Stillwater, Okla. 74078; Hayrettin Turk, P.O. Box 1113, Stillwater, Okla. 74076

[21] Appl. No.: 212,172

[22] Filed: Jun. 27, 1988

[51] Int. Cl.$^4$ .............................................. B01J 31/06
[52] U.S. Cl. .................................. 502/159; 568/327; 568/332; 568/734
[58] Field of Search ........................................ 502/159

[56] References Cited

U.S. PATENT DOCUMENTS 4,356,109 10/1982 Saeki et al. ...................... 502/159 X
4,791,081 12/1988 Childress et al. ................ 502/159 X

OTHER PUBLICATIONS

Sun et al., Macromolecules, Vol. 19, pp. 984–987 (1986).

*Primary Examiner*—Patrick P. Garvin
*Attorney, Agent, or Firm*—Robert B. Stevenson

[57] ABSTRACT

Colloidal suspensions of charged polymer particles containing charged metal complexes are prepared from charged polymer colloids by ion exchange. The charged polymer latex particles containing the metal complex are characterized as ranging from about 0.01 to 1.5 micrometers in diameter and containing from about 0.01 to 3.0 millimoles of metal complex per gram of dry polymer and are useful for catalysis of chemical reactions in aqueous dispersions.

8 Claims, No Drawings

POLYMER LATEXES CONTAINING METAL IONS AND COMPLEXES

The U.S. Government has a paid-up license in this invention and the right in limited circumstances to require the patent owner to license others on reasonable terms as provided for by the terms of contract No. DAAL03-86-K-0049 awarded by U.S. Army Research Office.

BACKGROUND OF THE INVENTION

1. Field of the Invention

This invention relates to colloidal polymer particles containing, metal ions and complexes at concentrations of 0.01 to 3.0 millimoles of metal per gram of polymer solids. The colloidal particles are of relatively uniform size 0.01 to 1.5 micrometers in diameter and are stabilized by charged functional groups. The invention also relates to the preparation of the particles with efficient incorporation of the metal ions and complexes, and the use of the particles for catalysis of chemical reactions in aqueous dispersions.

2. Description of the Prior Art

Colloidal polymer particles have been prepared and used extensively in the formulation of rubbers and coatings. They are generally prepared by the method emulsion polymerization, in which one or more vinyl monomers are dispersed in water with the aid of an ionic surfactant, and polymerization is initiated by thermal, photochemical, or redox formation of free radicals from a peroxy or azo compound. Many variations of the monomer, the emulsifier, and the initiator have been used. It is possible to form stable colloids even in the absence of an emulsifier if the initiator or a charged monomer contributes charged functional groups to the surface of the product particles. The method normally produces spherical particles 0.1 to 1.5 micrometers in diameter if no crosslinking monomer is used in the recipe. The particles may be as small as 0.01 micrometers in diameter if a crosslinking monomer is used.

Preparation of polymer particles with 0.01 to 3.0 millimoles of bound metal ions or complexes per gram of dry polymer requires polymers with at least molar equivalent amounts of counterions. Charged polymer colloids have high concentrations of ionic groups on their surfaces, and those groups may provide no more than about 0.01 to 0.1 millimoles of ionic groups per gram of counterions, depending on the particle size. Any amount of ionic groups in the colloid in excess of the amount needed to cover the surface must be located inside the particles. When the number of charged groups is so large that many are within the particles, the materials are commonly called ion exchange latexes. Ion exchange latexes often contain crosslinking units to prevent their dissolution in water as polyelectrolytes. Such materials have been prepared with the functional groups commonly used in ion exchange resins such as sulfonate ions, carboxylic acids or their salts, amines, and quaternary ammoniums ions, as described by Chong, Isacoff and Neely in U.S. Pat. No. 4,200,695 and by Upson in Journal of Polymer Science, Polymer Symposia, Vol. 72, pp. 45-54 (1985). Ion exchange latexes may be prepared by copolymerization of an ionic monomer with a crosslinking monomer, or by copolymerization of a functional monomer with a crosslinking monomer followed by conversion of the polymerized functional monomer to a charged functional group that serves as the ion exchange site. The monomer mixtures used for copolymerization to ion exchange latexes also often contain a comonomer such as styrene.

Metal complexes in aqueous solutions have been reduced in colloidal metal particles in the presence of water-soluble polymers which stabilize the metal particles in a colloidal state, as described by Hirai in Die Makromolekulare Chemie, Supplement 14, pp 55–69 (1985) and by Fendler in Journal of Physical Chemistry, Vol. 89, pp. 533–537 (1985), but those materials contain metal particles, not individual ions of bound metal complexes of the type of this invention. Metal ions have been trapped in coagulated polymer particles by precipitation of the polymer, as described by Gunesin, Journal of Polymer Science, Polymer Chemistry Edition, Vol. 22, pp. 353–363 (1984) but such a coagulum cannot be redispersed with complete retention of the metal, as can materials of the present invention.

Sun, Yan and Kitano (Macromolecules, Vol. 19, pp. 984–987 (1986) bound copper (II) to a polymer latex that was prepared from styrene, acrylic acid and divinylbenzene and modified by covalent attachment of histamine to part of the acrylic acid units. The copper latex was a catalyst for the air oxidation of ascorbic acid. However, the copolymer was prepared with only 2 percent by weight of acrylic acid, and the method of binding the copper ions to the latex was highly inefficient, since only 2.5 percent of the copper used became attached, and the final concentration of cooper was only 0.0057 millimoles per gram of dry polymer.

SUMMARY OF THE INVENTION

In contrast to the prior art, the present invention provides for metal complexes to be bound electrostatically to charged functional groups on the polymer. These charged groups may be mainly on the particle surface, or may be both on the surface and inside the particle. The compositions according to the present invention contain larger amounts of bound metal complexes, 0.01 to 3.0 millimoles of metal per gram of polymer, and the metal complexes are bound by a process that utilizes essentially all of the metal complex added to the polymer dispersion.

Thus, the compositions according to the present invention are charged polymer latex particles of from about 0.001 to about 1.5 micrometers in diameter which contain from about 0.01 to about 3.0 millimoles of metal complex per gram of dry polymer, and wherein the polymer may be either uncrosslinked or crosslinked with up to 25 mole percent of a polyfunctional monomer. The charged polymer latex particles according to the present invention are either negatively charged with the metal complex being a cation or are positively charged with the metal complex being an anion. The polymer may be a copolymer containing both ionic and neutral monomer units.

Further according to the present invention a method of catalysis is provided comprising the steps of:
(a) preparing an aqueous collodial suspension of charged polymer latex particles of from about 0.01 to 1.5 micrometers in diameter which contain from about 0.01 to 3.0 millimoles of metal complex per gram of dry polymer, wherein the polymer may be either uncrosslinked or crosslinked with up to 25 mole percent of a polyfunctional monomer; and
(b) contacting reactants in the presence of the aqueous colloidal suspension prepared in step (a), thus catalyzing their reaction.

It is an object of the present invention to provide novel charged polymer latex particles and aqueous colloidal suspensions thereof which contain metal complexes at higher concentration levels and at loading efficiencies approaching quantitative amounts. It is a further object to provide such charged polymer colloids with high levels of metal complexes in aqueous dispersions for the purpose of catalyzing chemical reactions. Fulfillment of these objects and the presence and fulfillment of other objects will be apparent upon complete reading of the specification and claims.

DESCRIPTION OF THE INVENTION

The compositions according to the present invention are charged polymer particles 0.01 to 1.5 micrometers in diameter containing 0.01 to 3.0 millimoles of metal complexes per gram of dry polymer. The number of charged sites in the particles may range from 0.5% to 99% of the number of repeat units of the polymer. The charged sites may be anionic or cationic. Anionic sites may be salts of carboxylic acids, sulfonic acids, phosphonic acids, or monoesters of sulfuric acid, phosphoric acid, or acids of sulfur or phosphorus in their lower oxidation states. Cationic sites may be the protonated forms of amines, quaternary ammonium ions, quaternary phosphonium ions, quaternary arsonium ions, or tertiary sulfonium ions. The polymer particles are prepared by the general method of emulsion polymerization, which involves the formation of charged organic polymer particles dispersed in water from mixtures of monomers, surfactants, and initiator in water. The origins of the ionic sites in the particles may be ionic monomer, charged groups on the surfactant, or charged groups on the initiator, or the ionic sites may be introduced by chemical reactions of the polymer particles after the particles have been formed. The polymer structure in the particles may be uncrosslinked, or may contain crosslinks in amounts of up to 25% of polymer repeat units. The metal complexes in the particles may be introduced by ion exchange of the desired metal for other ions in the polymer, by formation of covalent bonds between the polymer and metal complexes, or by copolymerization of monomers that contain the metal species. The introduction of the metal complexes by ion exchange or covalent bonding may be performed with the particles in a colloidal state or with precipitated particles that may be subsequently redispersed.

The sizes of colloidal polymer particles may be controlled by the conditions used for emulsion polymerization. Typically by use of a surfactant and no crosslinking monomer in a one stage polymerization procedure, spherical particles 0.05 to 0.3 micrometers in diameter are formed. Larger particles may be formed by the method of seed growth polymerization from preformed particles, or by use of little or no surfactant in the recipe. Smaller particles may be formed by the use of a crosslinking monomer and by the use of larger amounts of surfactant. The particles formed without use of a crosslinking monomer are usually quite uniform in size. A crosslinking monomer leads to formation of both smaller and less uniform sizes and shapes of particles. In some cases, particularly with a crosslinking monomer or with little or no surfactant, the final particles are formed by aggregation of much smaller particles. Aggregation continues until the particles have a sufficiently high surface charge density to be colloidally stable. Such aggregates may deviate from spherical shape, and the colloidal dispersions so formed usually have a broader distribution of particle sizes than do the spherical particles formed in the absence of a crosslinking monomer.

The particles of this invention form stable colloidal dispersions in water. As charged particles they may be precipitated by addition of large amounts of electrolytes to the water. Usually if the precipitated particles are washed free of the electrolyte promptly, they may be redispersed in water to stable colloids. Agitation by vigorous stirring or by ultrasonic radiation aids the redispersion process. The binding of metal ions and complexes to the emulsion polymer particles sometimes involves addition of electrolyte solutions to a colloid to effect exchange of added ionic metal complexes for non-metallic ions in the particles. Care should be taken in this step to avoid precipitation. If the particles do precipitate, they should be redispersed rapidly after the metal species have been incorporated. Such precautions may be necessary to obtain stable colloids with bound metal complexes.

The particles containing metal complexes that we have prepared are catalysts for reactions of organic compounds dispersed in water. Their catalytic specificities resemble those of homogeneous metal ions and complexes, because the metals in the particles exist in the forms of ions and complexes similar to those found in solution. However, they are heterogeneous catalysts because the metal complexes are bound to particles. It is well known that highly active heterogeneous catalysts depend upon a large surface area accessible to reactants for their activity. The 0.01 to 1.5 micrometer sizes of particles of this invention provide much higher external surface areas than do larger solid particles. Their specific surface areas are from about one square meter per gram to about six hundred square meters per gram, in the range usually associated with the porous solids most often used as supports for catalysts.

The anionic colloidal particles of this invention may be formed by emulsion copolymerization of monomers that are either anionic when they are polymerized or can be converted to anionic form after polymerization. Such monomers include acrylic acid, methacrylic acid, other 2-substituted acrylic acids, and derivatives of acrylic acid and 2-substituted acrylic acids that can be converted to the carboxylic acids or the carboxylic acid salts after polymerization. Derivative of acrylic and methacrylic acids include esters, anhydrides, and ortho esters that are easily hydrolyzed to the free acids or acid salts. Other examples of carboxylic monomers are maleic acid and derivatives of maleic acid that are easily hydrolyzed to polymer repeat units that are salts of maleic acid; itaconic acid and its salts and hydrolyzable derivatives; vinylbenzoic acid and its salts and hydrolyzable derivatives, and monomers that contain both a styrene-like vinyl group and a carboxylic acid, carboxylate salt, or hydrolyzable carboxylic acid derivative as the functional group; omegaacrylamidoalkanecarboxylic acids and other ester and amide derivatives of acrylic and methacrylic acid that contain carboxylic acids or their salts or hydrolyzable derivatives at positions in the molecular structure distant from the polymerizable acrylic or methacrylic group. The anionic sites may also be sulfonates formed by copolymerization of monomers such as the sodium, potassium and ammonium salts of styrenesulfonate, sodium 2-sulfoethyl methacrylate, methallylsulfonate, or sodium 2-acrylamido-2-methylpropanesulfonate. Anionic sites may be formed also by facile chemical conversion in a preformed polymer of a sulfonate derivative, such as hydrolysis of the methyl ester of styrenesulfonic acid to the ionic sulfonate. The sulfonate group in a monomer molecule may be separated from the polymerizable styrenic, acrylic, or methacrylic vinyl group by from one to as many as twenty bonds. Other monomers that could provide anionic sites in the particles are vinyl monomers containing phosphonic acids, phosphate esters, or their derivatives that can produce the phosphonate and phosphate anions readily by chemical reactions. Halogenated derivatives of all of the above monomers in which the halogen atoms are located in inert, unreactive positions, are also included among the sources of anionic colloidal particles of the invention. The preferred monomers of the invention that can be converted to anionic repeat units in the polymer particles are acrylic acid, methacrylic acid, sodium styrenesulfonate, sodium 2-acrylamido-2-methylpropanesulfonate, and methyl styrenesulfonate. After polymerization the acrylic acid and methacrylic acid repeat units must be treated with base to convert them to ionic form, and the methyl styrenesulfonate repeat units must be transformed to the sulfonate anion by treatment with a nucleophilic reagent such as ammonia or an amine. The range of compositions of anionic colloidal particles that may be prepared from anionic or anionizable monomers is from 0.5 to 99 mole percent of polymer repeat units.

Anionic groups may also be incorporated into the particles formed during emulsion polymerization by use of non-polymerizable anionic surfactants such as sodium dodecyl sulfate or sodium dodecylbenzenesulfonate, or from an initiator such as persulfate ion. However, the non-polymerizable surfactant and initiator can usually provide only less than 2 percent of charged sites based on polymer repeat units. That amount is usually less than the amount needed to bind the numbers of metal complexes described in this invention.

The cationic colloidal particles of this invention may be formed by emulsion copolymerization of monomers that are charged during polymerization or monomers that may be converted to charged groups by chemical reactions after the polymerization. Preferred examples of polymerizable cationic monomers are vinylbenzyltrimethylammonium chloride, vinylbenzyl(octadecyl)dimethylammonium chloride, ortho-12-styryloxydodecyltrimethylammonium chloride, para-12-styryloxydodecyltrimethylammonium chloride, and the quaternary ammonium bromide formed from 1-bromohexadecane and dimethylaminoethyl methacrylate. Other examples include quaternary ammonium ions, quaternary phosphonium ions, and quaternary arsonium ions that contain polymerizable vinyl groups of the types in styrene and in acrylic and methacrylic esters and amides. The cationic sites may also be formed by copolymerizations of amine monomers. The amine groups will be mostly protonated when the particles are in water of pH less than or equal to the pKa's of the amines, and under those conditions the particles may have high net positive charge.

Cationic sites may be introduced by polymer-analogous reactions carried out after the emulsion polymerization. The preferred example of such a material is the product of reaction of a copolymer of chloromethylstyrene with trimethylamine. Cationic sites may be produced also by the reactions of chlormethylstyrene copolymers with many other amines such as triethylamine, tri-n-propylamine, tri-n-butylamine, dimethylethanolamine longer chain trialkylamines and long chain alkyldimethylamines. The reactions of amines with chloromethylstyrene polymers may be performed in water if the amine is soluble in water, but reactions with water-insoluble amines must be performed in the presence of organic solvents. Alternatively the chloromethylstyrene repeat unit in the copolymer may be formed by chlorination of the methyl group of a methylstyrene copolymer using sodium hypochlorite as the chlorinating agent and a phase transfer catalyst as described by Ford and Mohanraj in U.S. Pat. No. 4,713,423.

The range of concentrations of cationic sites in the particles covers from 0.5 to 99 percent of polymer repeat units. Polmerizable cationic monomers can be used for preparation of particles containing 0.5 to about 6 percent of charged repeat units, while the post-polymerization modification method can be used for compositions over the entire range. Cationic groups could also be incorporated by the use of non-polymerizable cationic surfactants such as cetyltrimethylammonium bromide during the polymerization, but that method generally leaves only less than 2 mole percent of charged groups based on polymer repeat units. The combination of a cationic surfactant and either a cationic initiator such as azobis(2-amidinopropane) dihydrochloride or a neutral initiator such as azobis(isobutyronitrile) during the emulsion polymerization followed by post-polymerization conversion of chloromethyl groups of quaternary ammonium ions can be used to produce latexes with large numbers of cationic sites and no anionic sites.

The polymer particles of this invention may be crosslinked or uncrosslinked. Polymers containing a large number of charged functional groups are generally soluble in water unless they are crosslinked. Concentrations of ionic functional groups that are greater than some value in the range of 0.4 to 1.0 millimoles of charged groups per gram of dry polymer confer water solubility on an uncrosslinked polymer. In this invention particles that contain from 0.5 to about 6 mole percent of charged repeat units may be prepared without a crosslinking monomer, and particles that contain 0.5 to 99 mole percent of charged repeat units may be prepared with a crosslinking monomer to provide colloidal particles that do not dissolve in water.

The crosslinking monomer may be any that copolymerizes well with the required charged and functional monomers. Examples are divinylbenzenes, diisopropenylbenzenes, divinyltoluenes, other divinylaromatic compounds, trivinylbenzene, ethylene dimethacrylate, diethylene glycol dimethacrylate, triethylene glycol dimethacrylate, tetramethylene dimethacrylate, hexamethylene dimethacrylate, trimethylolpropane trimethacrylate, pentaerythritol tetramethacrylate, the acrylates corresponding with these same methacrylates, divinyl ethers, and divinylsulfones. The preferred crosslinker is divinylbenzene, either as a mixture of meta and para isomers or as one of the pure isomers. The crosslinking monomer may comprise 0.5 to 25 mole percent of the monomer mixture. The preferred amounts are 1 to 5 mole percent.

The emulsion copolymers of this invention may also contain comonomers that are neither charged nor crosslinking. The comonomers may be either inert or active in the binding of metal complexes. Preferred examples of inert comonomers are styrene, ethylvinylbenzene, vinyltoluene, and methyl methacrylate. Many other inert comonomers are possible, with the only requirements being that they copolymerize well in emulsion polymerization with the charged and crosslinking monomers of this invention and they are inert during post-functionalization and incorporation of metal ions or complexes. The preferred examples of active comonomers are vinylpyridines and vinylimidazoles, which can serve as strong ligands for metal ions. Other examples include precursors of vinylamine repeat units such as N-vinylacetamide and N-vinylphthalimide; chelating monomers such as vinyl-9,10-phenanthroline, vinyl derivatives of ethylenediamine and diethylenetriamine, and vinyl derivatives of beta-dicarbonyl compounds; and phosphine monomers such as p-styryldiphenylphosphine. The amounts of inert and active comonomers used in the emulsion polymerizations may range from zero to 96 mole percent of the monomer mixture. Combinations of inert and active comonomers may also be used.

Metal ions and complexes are incorporated into the colloidal particles of this invention by ion exchange or by copolymerization of metal-containing monomers. The preferred method is ion exchange. When the polymer particles contain anionic functional groups such as carboxylates or sulfonates, metal cations in aqueous solutions are added to the sodium or potassium form of the polymer. The binding affinities of most cations for cation exchange polymers are greater than the binding affinities of the sodium and potassium ions. We have found that it is much easier to incorporate metal ions into the cation exchange latexes containing carboxylate groups when the particles are initially in the sodium or potassium form rather than in the hydrogen form. Addition of aqueous solutions of divalent and trivalent metal salts to the aqueous colloid in hydrogen form frequently leads to coagulation of the particles, whereas addition to the sodium or potassium form usually maintains colloidal stability. Rapid stirring or sonication of the colloid during and immediately after addition of the divalent or trivalent metal salt also helps to produce stable rather than coagulated colloids containing the metal ions. When the molar equivalents of metal cations added do not exceed the molar equivalents of the sodium or potassium ions in the latex particles available for exchange, this method results in complete incorporation of the metal ions into the particles. Complete exchange within the limits of experimental measurements has been proven in specific examples, such as the addition of cobalt ions to the potassium form of acrylic acid latexes, by ultrafiltration of the latex and testing of the filtrate for cobalt ions. No cobalt ion was found in the ultrafiltrate. Examples of metals that can be bound to the particles by the ion exchange method include but are not limited to titanium, vanadium, chromium, manganese, iron, cobalt, nickel, copper, zinc, zirconium, niobium, molybdenum, ruthenium, rhodium, palladium, silver, cadmium, indium, tin, tungsten, rhenium, osmium, iridium, platinum, gold, mercury, thallium, and lead. If a metal ion is bound to the latex in uncomplexed form, it can be converted to complexed form by the addition of nitrogen ligands such as ammonia, pyridine, or N-methylimidazole, or by the addition of other ligands that do not change the sign of electric charge of the metal complex from positive to zero or less than zero. Alternatively some of the ligands of the metal complex may be covalently part of the latex such as 2-vinylpyridine, 4-vinylpyridine, N-vinylimdazole or a derivative of acetylacetonate.

When the polymer particles contain cationic functional groups such as quaternary ammonium ions, the ion exchange method of binding metals requires that the metal be in the form of an anionic complex, for the polymer is an anion exchange resin that is usually in its chloride or bromide form after initial preparation. The chloride or bromide counterion of the polymer is exchanged for an anionic metal complex. Examples of such complexes include the carboxylate and sulfonate derivatives of metalloporphyrins and metallophthalocyanines, in which the metals include but are not limited to titanium, vanadium, chromium, manganese, iron, cobalt, nickel, copper, zinc, zirconium, niobium, molybdenum, ruthenium, rhodium, palladium, silver, cadmium, indium, tin, tungsten, rhenium, osmium, iridium, platinum, gold, mercury, thallium, and lead. Metals which may exist in aqueous solution as polyhalometallate anions also are readily incorporated into the anion exchange colloidal particles. Examples of such complexes include but are not limited to the anionic halide, cyanide, and thiocyanate complexes of platinum(IV), platinum(II), palladium(II), rhodium(I), iridium(I), iron(III), zinc(I), and cobalt(II). Also included are complexes in which the metal bears both halide and amine ligands with the number of halide ions exceeding the oxidation number of the metal so that the complex is an anion. Ligands on the metal may also include bidentate oxygen donors such as acetylacetonate, nitrogen donors such as 9,10-phenanthroline, or sulfur donors such as N,N-diethyldithiocarbamate.

The colloidal particles containing metal complexes can be useful as catalysts. The types of reactions that may be catalyzed include oxidations, reductions, substitutions, additions, eliminations, disporportionations, polymerizations, and many other reactions of low molar mass compounds that are normally catalyzed by homogeneous metal complexes. The limitations are that the chemical reaction to be catalyzed must not be inhibited by water or by other components of the colloidal polymer particles, and the reactants and products must not undergo side reactions with water or other components of the colloidal polymer particles. The catalytic processes may be performed under batch conditions with isolation of the products by distillation or extraction from the colloid. The colloidal catalysts may be reused after removal of the products. Alternatively reaction products may be separated from the catalyst particles by deliberate coagulation and precipitation of the particles followed by filtration from the aqueous mixture. In some cases it is possible to redisperse the coagulated catalyst particles to their original colloidal state, but in other cases the coagulation is irreversible. It is also possible to use the coagulated particles as catalysts. However, if the activity of the catalyst depends on high surface area, the coagulated catalyst will be less active than the catalyst in colloidal form. The latex particles might be used as catalysts also by embedding them into polymer films or membranes, or by binding them to the outer surfaces or pore surfaces of membranes, or by binding them to the surfaces of much larger particles of materials such as silica, alumina, zeolites, and cross-linked polymer particles that are commonly used as supports for chromatography and for heterogeneous catalysts and that could be packed into a chromatographic column or a flow reactor.

Latexes containing metal complexes may also have non-catalytic uses. In any of the forms described above the metals may serve as binding sites for specific ligands ranging from molecules as small as dioxygen to molecules as large as proteins. The type of ligand bound would depend on the chemical nature of the metal complex. Specific binding of dioxygen by a membrane containing certain latex particles might make that membrane selectively permeable to oxygen. The binding of specific proteins to metal complexes in latexes that are coated onto particles of polymers or silica in a chromatography column might enable the chromatographic separation of proteins on an analytical or a preparative scale. Coatings of latex particles might be designed to contain certain metal complexes as pigments to provide color, as antioxidants to prevent oxidative decomposition of the substrate, or as pesticides to prevent destruction of the substrate by fungi, insects, or rodents.

The following examples are intended to further illustrate the invention, and as such should not be interpreted as unduly limiting.

EXAMPLES 1-5

A general method is described here for preparation of copolymer latexes containing acrylic acid or methacrylic acid and for the binding of cobalt(II) to the latexes. The compositions and properties of the latexes are listed in Table 1. Emulsion polymerizations were carried out in a 500-ml, 4-neck round-bottom flask equipped with an overhead stirrer having a 2-inch semicircular Teflon blade, a reflux condenser, a thermometer connected to a THERM-O-WATCH temperature controller probe, and an addition funnel. The addition funnel was equipped with a mechanical stirrer connected by a flexible shaft to a variable speed motor. The flask was connected to a vented inert gas inlet through the condenser. Sodium dodecyl sulfate (0.6 g, 99%) and water (160 ml, deionized and distilled in glass) were placed in the flask, and the solution was heated to 600° C. with constant stirring under a gentle flow of argon for 1 hour. The solution was allowed to cool to room temperature under argon. The monomer charge was prepared separately by mixing sodium dodecyl sulfate (1.2 g), sodium bisulfite (0.06 g), water (40 ml) and 100 g of monomers consisting of styrene, acrylic acid or methacrylic acid, and divinylbenzene in the predetermined mole ratio. The monomer mixture was sparged with argon for 15 minutes and then transferred to the addition funnel and stirred at 200 rpm to form a pre-emulsion.

Potassium persulfate (0.33 g) and sodium bisulfite (0.02 g) were added to the reaction flask, and the contents were heated to 60° C. Initially 10 ml of monomer was added to start the polymerization. The formation of opaque polymer latex was observed within 30 minutes. The monomer mixture was added continuously at a rate that maintained the reaction temperature above 60° C. After about 75% of the monomer had been added in a period of about 40 minutes, the exothermic reaction caused the temperature to rise to 75° C. The flask was then cooled and the monomer addition was controlled to keep the temperature below 75° C. After the addition of monomers the mixture was stirred at 65° C. for 8 hours, more potassium persulfate (0.05 g) and sodium bisulfite (0.01 g) were added, and the mixture was stirred for another 2 hours at 65° C. The polymer latex was allowed to cool to room temperature and was filtered through a 400 mesh stainless steel wire screen to remove any coagulum. Most of the latexes did not contain any coagulum. The wt % solids was determined by evaporating a weighed sample (1-2 g) in an aluminum pan at 120° C. for 6 hours, cooling the pan in a desiccator over phosphorus pentoxide, and weighing the dry sample. The latexes typically contained 10-30% polymer solids.

Solid polymer was isolated for spectroscopy by addition of 5 ml of saturated NaCl solution to a 5 g sample of the latex to precipitate the polymer. The polymer was separated by centrifugation, thoroughly washed with 40% aqueous methanol and finally with methanol, and dried in vacuum at 50° C. overnight. The IR spectra of copolymers containing either acrylic acid or methacrylic acid showed absorptions at 3600-3300 (br), 1750(m), and 1710 cm$^{-1}$(s) in addition to the usual polystyrene absorptions.

Cobalt(II) was bound to latexes containing acrylic or methacrylic acid as follows. A known weight of the latex (5-10% solids) was allowed to react with 0.1 M KOH to convert 10 to 95% of the carboxylic acid groups to potassium salts. No precipitation of the latex was observed. A 0.028 M stock solution of Co(II) acetate in water was added to convert 5 to 95% of the available potassium carboxylate to Co(II) carboxylate. The latex was kept in an ultrasonic bath for 30 minutes. Depending on the carboxylic acid content of the starting latex, up to 95% of these groups could be converted to Co(II) salts. A typical example follows:

To 31 g (containing 31% polymer) of a latex prepared from 20 mol % acrylic acid (19.2 mmol COOH), 100 ml of water followed by 9.5 ml of 1.03 N KOH (9.8 mmol) was added with ultrasonic agitation. The latex mixture was heated at 70° C. for 30 minutes, and 16 ml of 0.0281 M cobalt(II) acetate (0.45 mmol Co) solution was added to the cooled latex with ultrasonic agitation. The solids content of the latex was determined by heating 1 g of sample at 130° C. for 10 hours and weighing the residue.

Co(II)-containing latexes were purified by ultrafiltration as follows. Latexes were diluted to contain about 5-10% solids and ultrafiltered through a 0.1 micrometer membrane (Millipore) in a pressure filter apparatus under a nitrogen pressure of 60-70 psig. The filtration apparatus was shaken continuously with a wrist-action shaker to prevent caking of solids on the membrane. The filtration was continued with incremental addition of a total of 1000 ml of fresh water until the conductivity of 50-100 ml aliqouts of the filtrate was reduced from an initial value of $2,300 \times 10^{-6}$ ohm$^{-1}$ cm$^{-1}$ to a constant final value of $43 \times 10^{-6}$ ohm$^{-1}$ cm$^{-1}$ after 2 days. During the washing of the latex the membrane had to be changed once to maintain a reasonable flow rate. Concentrated latex on the filter membrane was redispersed by agitating the suspension in the ultrasonic bath.

TABLE 1

Colloidal Acrylic Acid and Methylacrylic Acid Copolymers and Cobalt Catalysts

| Example | copolymer styrene | composition$^a$ acid | DVB | COOH/ Co(II)$^b$ | mg-atom Co/ g polymer | wt. % solids | $d_n{}^c$ nm |
|---|---|---|---|---|---|---|---|
| 1 | 79 | 20MA | 1 | 18.6 | 0.11 | 2.1 | 58 |
| 2 | 79 | 20MA | 1 | 8.0 | 0.25 | 1.3 | 58 |
| 3 | 79 | 20AA | 1 | 17.4 | 0.12 | 2.0 | 62 |
| 4 | 23 | 76AA | 1 | 2.3 | 4.2 | 1.0 | 140 |

TABLE 1-continued

Colloidal Acrylic Acid and Methylacrylic Acid Copolymers and Cobalt Catalysts

| Example | copolymer styrene | composition[a] acid | DVB | COOH/ Co(II)[b] | mg-atom Co/ g polymer | wt. % solids | $d_n$[c] nm |
|---------|-------------------|---------------------|-----|-----------------|----------------------|--------------|-------------|
| 5       | 79                | 20AA                | 1   | 42.6            | 0.05                 | 4.4          | 60          |

[a] Mol % styrene and ethylvinylbenzenes (from the DVB), acrylic acid (AA) or methacrylic acid (MA), and divinylbenzenes (from 55% technical DVB) in the monomer mixture.
[b] Mols of COOH in the original latex per mol of Co in the catalyst.
[c] Number average diameter of particles with standard deviation.

EXAMPLE 6

This example describes the incorporation of cupric ions into the acrylic acid copolymer latex of Example 5. A 10 ml sample of the aqueous latex which contained 3.135 mg of solid and 6.25 mmol of carboxylic acid groups was neutralized with 25 ml of 0.25 M NaOH with stirring and heating at 60° C. for 0.5 hours. After cooling to room temperature 25 ml of 0.050 M cupric chloride solution was added dropwise with stirring to give a light blue latex. Stirring was continued for 4 hours. Ultrafiltration of the latex gave filtrate free from cupric ions, as determined by adding a solution of ammonium chloride, which forms a deep blue complex with cupric ion.

EXAMPLE 7

An emulsion copolymer was prepared from styrene, sodium 4-styrenesulfonate (NaSS) and divinylbenzene by the shot-growth process previously described by Kim et al., Journal of Polymer Science, Polymer Chemistry Edition, Vol. 26 (1988). An initial charge of monomers containing <1 wt % NaSS was polymerized using potassium persulfate and sodium bisulfite as redox initiator to >92% conversion. A second charge of monomers and redox initiator was added and polymerized to completion. The NaSS comprised 4.6 wt % of the total monomer used. The emulsion polymerization was carried out in equipment similar to that described for the styrene/acrylic acid latexes except for the following differences. A 250-ml 3-neck flask without an addition funnel was used, and the flask was heated using an oil bath controlled by a THERMO-WATCH.

First Stage. The initial charge of styrene (16.0 g, 150 mmol), DVB (0.20 g, 0.85 mmol), and water (100 ml) was placed in the reaction flask. The mixture was heated to 50° C. for 15 minutes and then cooled under a gentle flow of argon. Potassium persulfate (0.12 g, 0.44 mmol), sodium bisulfite (0.045 g, 0.43 mmol), sodium carbonate (0.070 g, 0.66 mmol), and NaSS (0.1 g, 0.5 mmol) were dissolved in 15 ml of water and sparged with argon. The initiator charge was injected into the reaction flask maintained at 60° C. with 270 rpm stirring. After 25 minutes the reaction appeared milky with a blue tinge. A 2 ml sample was withdrawn after 5 hours to determine the percent solids. The reaction had proceeded to 90% conversion at this stage (average 2 runs).

Second Stage. After completion of the above analysis (6.5 hours after the start of the polymerization) styrene (4.0 g, 38 mmol), DVB (0.25 g, 0.9 mmol), NaSS (1.0 g, 0.5 mmol), potassium persulfate (0.1 g, 0.37 mmol), and sodium bisulfite (0.03 g, 0.028 mmol) in 30 ml of water were sparged with argon for 5 minutes and added to the first stage latex. The reaction mixture was stirred for 10-12 hours at 60° C., cooled to room temperature, and filtered through a 400 mesh wire screen to remove any coarse solids.

A 5 g sample of the latex was purified by ultrafiltration through a 0.1 micrometer Millipore cellulose acetate/nitrate filter until the conductivity of the filtrate was constant at $15 \times 10^{-6}$ ohm$^{-1}$ cm$^{-1}$. The solid polymer was isolated by evaporating the water under reduced pressure and drying in a vacuum desiccator at 50° C. overnight. Its IR spectrum showed bands at 1160 (m) and 910 cm$^{-1}$ (m) for the sulfonate group in addition to the usual spectral bands for polystyrene.

Cobalt(II) was bound to the latex as described in Examples 1-5. Properties are listed in Table 2.

EXAMPLES 8 AND 9

Copolymer latexes of styrene, 4-vinylpyridine, sodium styrene-4-sulfonate, and divinylbenzene were prepared by the shot-growth method of Example 7. Properties of the latexes are listed in Table 2. The polymerization was initiated by potassium persulfate at 65° C. The initial monomer charge of styrene (10.4 g, 100 mmol), 4-vinylpyridine (0.334 g, 3.2 mmol), and DVB (0.262 g, 1.1 mmol) in 80 ml of water was mixed with an initiator charge of potassium persulfate (0.14 g, 0.5 mmol), NaSS (0.26, 1.3 mmol), and sodium bicarbonate (0.11 g, 1.3 mmol) in 20 ml of water. The "shot" charge was added 5 hours after the initial charge, at which time the conversion of initial monomers to polymer was typically 92%. The shot charge was prepared from styrene (3.6 g, 34 mmol), 4-vinylpyridine (1.24 g, 12 mmol), NaSS (0.74 g 3.7 mmol), potassium persulfate (0.15 g, 0.55 mmol), and sodium bicarbonate (0.18 g, 2.2 mmol) in 20 ml of water. The reaction was continued at 65° C. for 6 hours and at 85° C. for 2 hours. The latex was cooled, filtered through a 400 mesh wire screen to remove coarse particles, and steam distilled to remove any unreacted 4-vinylpyridine and styrene. A 5 g sample of the latex was thoroughly purified by ultrafiltration through a 0.1 micrometer Millipore filter, andthe solid polymer was separated by evaporation of water under reduced pressure. Its IR spectrum showed typical absorptions for the pyridine moiety at 1550 (m), 1420 (s), 1220 (m), and 1000 cm$^{-1}$ (w) in addition to the usual spectral bands for polystyrene and for the sulfonate group.

Cobalt (II) was bound to the latexes as described in Examples 1-5.

EXAMPLE 10

This example describes the preparation of a latex from the lipophilic acrylic monomer, 2-dodecylpropenoic acid, and styrene by emulsion copolymerization. A mixture of 2-dodecylpropenoic acid (0.240 g, 1.0 mmol), styrene (5.10 g, 49 mmol), and water (100 ml) was stirred under nitrogen for 15 minutes to form a pre-emulsion in a 250-ml 3-neck flask equipped with condenser, thermometer, and THERMO-WATCH temperature controller. The system was purged with nitrogen, and a nitrogen-sparged solution of potassium persulfate (70 mg, 0.5 mol %) in 5 ml of water was added. The mixture was stirred and heated at 65° C. for 17 hours and at 70° C. for 6 hours. The polymer latex was sparged with nitrogen at 70° C. for 30 minutes to remove a trace of unreacted styrene. The latex was cooled to room temperature and filtered through a 400 mesh stainless steel wire screen. The latex was ultrafiltered and washed with 4×100 ml portions of water until the conductivity, of filtrate decreased from $1400 \times 10^{-6}$ ohm$^{-1}$ cm$^{-1}$ initially to a constant final value of $34 \times 10^{-6}$ ohm$^{-1}$ cm$^{-1}$. The ultrafiltered latex contained 0.98% solids. It was converted to the cobalt catalyst as described in Examples 1-5. Properties are listed in Table 2.

was added to the cooled latex with ultrasonic agitation. The latex was purified by ultrafiltration through a 0.1 micrometer membrane. No green color of Cr (III) ion could be seen in the filtrate. The solids content of the Cr(III) latex was 5.0%.

EXAMPLE 13

This procedure describes the autoxidation of tetralin with latex-bound Co(II) catalysts. Specific results are listed in Tables 3 and 4, and comparisons of the latex catalysts with the corresponding cobalt(II)-pyridine catalyst in aqueous solution and with cobalt(II) acetate in acetic acid are listed at the end of Table 3. A weighed amount of latex catalyst (to give final Co(II) concentra-

TABLE 2

Latexes and Co(II) Latexes from NaSS, 4-Vinylpyridine, and 2-Dodecylpropenoic Acid

| Example | copolymer composition[a] | | | | anion/Co | Co content[b] | Pyr/Co | wt. % solids | $d_n^c$ nm |
|---|---|---|---|---|---|---|---|---|---|
| | styrene | anionic | 4-VP | DVB | | | | | |
| 7 | 96 | 3.1 NaSS | 0.0 | 0.9 | 2.6 | 0.10 | 6 | 4.2 | 170 |
| 8 | 80 | 2.5 NaSS | 17.8 | 0.6 | 4.5 | 0.06 | 40 | 3.5 | 202 |
| 9 | 86 | 3.3 NaSS | 9.8 | 0.7 | 5.9 | 0.05 | 17 | 4.0 | 95 |
| 10 | 98 | 1.4[d] | 0.0 | 0.0 | 2.0 | 0.068 | 6 | 0.17 | 92[e] |

[a]Amounts are in mole percent. Styrene includes ethylvinylbenzene from the technical DVB.
[b]mg-atom Co per g polymer.
[c]Number average particle diameter.
[d]2-Dodecylpropenoic acid.
[e]Irregular clusters of smaller primary particles.

EXAMPLE 11

This example describes the preparation of a latex containing both cupric ions and palladium (II) complex. A 10 g, 6.6% solids sample of the NaSS copolymer latex of Example 7 was treated with 4 ml of 0.010 M cupric chloride (0.040 mmol) and sonicated for 10 minutes to convert 50% of the available sodium sulfonate groups to copper salts. A $4.0 \times 10^{-3}$ M solution of PdCl$_2$ in water (2.0 ml pH 2.5) was added to convert 10% of the sodium sulfonate groups to Pd(II) sulfonate. The latex was sonicated for 10 minutes. No precipitation was observed. The latex was diluted to 1.5% solids and ultrafiltered. The first 40 ml of the filtrate was tested for cupric ions by the oxalic bis(cyclohexylidenehydrazide) (cuprizon) test and found to contain less than 1% of the cupric ion added initially. The filtrate was also tested for palladium (II) by the p-nitroso-N,N-dimethylaniline test and found to contain less than 2% of the Pd(II) added initially.

EXAMPLE 12

This example illustrates the preparation of a latex containing chromium(III). To 10.0 g of the copolymer latex of Example 1, which contained 31.7% polymer solids and 6.2 mmol of methacrylic acid repeat units, was added 5.0 ml of 0.102 M KOH with ultrasonic agitation. The mixture was heated at 70° C. for 30 minutes, and 3.0 ml of 0.050 M Cr (III) nitrate (0.15 mmol)

tion of $1-5 \times 10^{-4}$ M) and a magnetic stirring bar were placed in a 100-ml round-bottom flask with a stoppered side arm. The required amount of pyridine was added as a 0.05 M stock solution and the final volume was adjusted to 30.0 ml with water. The pH of the aqueous phase was adjusted to 8.5 with 0.1 M KOH, or with 1.0 ml of 0.1 M borate buffer (a mixture of sodium borate and HCl) before adding the final portion of water. The consumption of oxygen with time was followed in a gas buret which allowed the reaction to proceed at constant pressure of oxygen. The flask was connected to the gas buret through a condenser. The system was swept with dioxygen under reduced pressure (10-20 mmHg). The flask was immersed in an oil bath at 50.0° C. and equilibrated for 30 minutes before adding tetralin. Tetralin was transferred using a weighed syringe through the side arm which had been fitted with a rubber septum. After stirring for 5 minutes, the system was set to measure the dioxygen consumption which started after an induction period. The oxygen uptake was followed for 6-18 hours, and the reaction mixture was worked up after 24 hours. After cooling to room temperature, 5 ml of saturated aqueous NaCl was added to coagulate the latex. The mixture was extracted with diethyl ether (4×25 ml), and the combined ether extract was washed with 0.1 M HCl (10 ml), water (3×25 ml) until neutral (pH paper), and saturated NaCl (25 ml). The ether was dried over anhydrous magnesium sulfate and distilled. The reaction products were analyzed by GLC.

TABLE 3

Autoxidation of Tetralin Using Latex Catalysts of Examples 1-5[a]

| catalyst example number | initial composition | | | | mol % of initial tetralin | | | | |
|---|---|---|---|---|---|---|---|---|---|
| | latex mg | Co(II) mmol | Py mmol | tetralin mmol | $O_2^b$ consumed | GLC analysis[c] | | | |
| | | | | | | tetralin | tetrol | tetralone | THP |
| 1 | 182 | 0.020 | 0.120 | 1.83 | 69 | 35 | 21 | 41 | 6 |
| 2 | 79 | 0.020 | 0.120 | 1.83 | 62 | 42 | 20 | 36 | 4 |
| 2[d] | 79 | 0.020 | 0.120 | 1.83 | 52 | 53 | 15 | 29 | 4 |
| 3 | 365 | 0.042 | 0.252 | 3.90 | 68 | 37 | 19 | 42 | 4 |
| 4 | 14 | 0.042 | 0.252 | 3.90 | 48 | 55 | 16 | 26 | 2 |

TABLE 3-continued

Autoxidation of Tetralin Using Latex Catalysts of Examples 1-5[a]

| catalyst example number | initial composition | | | | mol % of initial tetralin | | | | |
|---|---|---|---|---|---|---|---|---|---|
| | latex mg | Co(II) mmol | Py mmol | tetralin mmol | $O_2$[b] consumed | GLC analysis[c] | | | |
| | | | | | | tetralin | tetrol | tetralone | THP |
| 5 | 400 | 0.020 | 0.120 | 1.83 | 82 | 21 | 25 | 49 | 12 |
| 1 | 510 | 0.057 | 0.360 | 3.00 | 67 | 38 | 20 | 39 | 6 |
| CoPy[e] | | 0.057 | 0.360 | 3.00 | 45 | 57 | 14 | 27 | 4 |
| Co(OAc)$_2$[f] | | 0.057 | 0.0 | 3.30 | 25 | 76 | 2.5 | 22 | 2 |

[a]Reactions were carried out at 50.0° C. for 24 hours at dioxygen pressure of 720 mmHg (20 mmHg less than atmospheric pressure) with magnetic stirring of 30.0 ml of reaction mixture.
[b]Dioxygen consumed form the gas buret as mol percent of initial tetralin.
[c]Corrected for 50% decomposition THP in the injection port of the gas chromatograph.
[d]Oxidation was carried out in air at atmospheric pressure (150 psi of dioxygen).
[e]Catalyst was soluble Co(II)/pyridine in water at pH 8.5.
[f]Cobalt(II) acetate in acetic acid.

TABLE 4

Oxidation of Tetralin Using Cobalt Latexes of Examples 7-10[a]

| catalyst example | $O_2$ consumed | GLC analysis, as mol % of initial tetralin[b] | | | |
|---|---|---|---|---|---|
| | | tetralin | tetrol | tetralone | THP |
| 7[c] | 67 | 36 | 15 | 25 | 24 |
| 7[c,d] | 70 | 24 | 19 | 24 | 32 |
| 8 | 49 | 54 | 10 | 23 | 12 |
| 9 | 62 | 41 | 13 | 35 | 10 |
| 10[e] | 76 | 30 | 22 | 44 | 4 |

[a]Reactions were carried out at 50° C. for 14 hours at 730 mmHg pressure of dioxygen with 0.020 mmol Co catalyst and 1.8 mmol of tetralin with magnetic stirring of 30.0 ml of reaction mixture. The pH was maintainedat 8.5 with 1 ml of 0.1 M borate buffer.
[b]Corrected for THP partial decomposition in the injection port of the gas chromatograph.
[c]With 0.13 mmol added pyridine.
[d]24 hour reaction time.
[e]Reaction was carried out at 50° C. for 25 hours at 731 mmHg pressure of dioxygen with 0.002 mmol Co catalyst, 0.97 mmol of tetralin and 0.013 mmol pyridine with magnetic stirring of 30.0 ml of reaction mixture.

EXAMPLE 14

This example describes the autoxidation of tetralin with repeated addition of portions of tetralin to the cobalt latex of Example 5. The reaction was conducted as usual for measurement of dioxygen consumption as a function of time. Fresh samples of 1.83 mmol of tetraline were added by syringe after consumption of a molar amount of dioxygen corresponding with more than 90% of the tetralin charged. A 0.5 ml aliquot of the reaction mixture was extracted and analyzed by GC before addition of each new portion of tetralin, and the entire mixture was worked up at the end of the experiment, 10 hours after addition of the fourth portion of tetralin. Percent molar compositions of tetralin, THP, tetrol, and tetralone in the mixture after each cycle were: 1) 15, 4, 25, 56; 2) 10, 5, 20, 69; 3) 9, 4, 15, 70; 4) 39, 3, 5, 52.

EXAMPLES 15-19

This procedure describes the preparation of anion exchange latexes by emulsion copolymerization of chlormethylstyrenes, reaction of the latexes with trimethylamine to form the quaternary ammonium ions, and binding of cobalt phthalocyaninetetrasulfonate (CoPcTs) to make the latexes catalytically active for autoxidation reactions. The properties of the latexes are listed in Table 5. Examples 15 and 16 were emulsion polymerized with sodium dodecylsulfate as the surfactant, and Examples 17-19 were polymerized with hexadecyltrimethylammonium bromide.

A 500-ml round-bottom flask equipped with an overhead stirrer with a teflon blade, a condenser, a thermometer, a nitrogen inlet, and an addition funnel also equipped with an overhead stirrer with a teflon blade, and a nitrogen inlet was charged with sodium dodecylsulfate (0.40 g, 1.39 mmol) and, 120 ml of deoxygenated distilled water. This mixture, A, was stirred under nitrogen and heated to 65° C. in a thermostated oil bath. The addition funnel was charged with mixture B, which contained sodium dodecylsulfate (1.12 g, 3.88 mmol), deoxygenated distilled water (30 ml), divinylbenzene (2.4 g, 0.11 mmol, 55% active), and chloromethystyrenes (29.0 g, 190 mmol, a 7/3 meta/para mixture). While the mixture B was being stirred continuously, sodium bisulfite (50 mg, 0.48 mmol) was added to it. Sodium bisulfite (11 mg, 0.11 mmol) and potassium persulfate (0.25 g, 0.92 mmol) were added to the mixture A, and then mixture B was added dropwise to stirred mixture A over 1 hour. After addition was complete, sodium bisulfite (7 mg, 0.07 mmol) and potassium persulfate (25 mg, 0.08 mmol) were added to the emulsion. The latex was cooled to 20° C. and was neutralized to pH 7 with 25 ml of 2% NaOH.

A solution of 24% aqueous trimethylamine (47 g) diluted with 70 ml of water was added to the chloromethylstyrene latex. The mixture was stirred at 40° C. for 16 hours and at 60° C. for 2 hours to form the quaternary ammonium chloride latex. The latexes of Examples 16-19 were filtered through filter paper and stored before further use. The latex of Example 15 was precipitated by adding 4 volumes of acetone. The clear supernatant was decanted, and the polymer was washed with acetone several times and dried in a vacuum desiccator. The chloride ion contents of the latexes were determined by the Volhard titrimetric method three times, and the average results are listed in Table 5. Particle sizes of the latexes were measured from transmission electron micrographs.

The quaternary ammonium chloride latexes were converted to cobalt phthalocyaninetetrasulfonate latexes by addition of the appropriate amount of cobalt phthalocyaninetetra(sodiumsulfonate) with sonication for 0.5 hours. Ultrafiltration of the latexes through 0.1 μm cellulose acetate/nitrate membrane revealed no blue CoPcTsNa$_4$ in the filtrate. Thus all of the CoPcTs was retained in the blue latex of each sample. The intensely blue CoPcTs in water is detectable by human eye to concentrations of $<10^{-7}$ M, which then is the upper limit to the concentration of CoPcTs in the aqueous phase.

TABLE 5

| latex example | \multicolumn{4}{c}{Ion Exchange Latexes and CoPcTs Catalysts} | | | |
|---|---|---|---|---|---|---|---|
| | copolymer composition, mol %[a] | | | | wt % solids | DF[b] $N^+Cl^-$ | $d_n^c$ nm |
| | CMS | DVB | EVB | styrene | | | |
| 15[d] | 91.2 | 4.9 | 3.9 | 0.0 | solid | 0.61 | 54 |
| 16[d] | 98.2 | 1.0 | 0.8 | 0.0 | 4.6 | 0.87 | 74 |
| 17[e] | 91.3 | 4.8 | 3.9 | 0.0 | 9.4 | 0.81 | 55 |
| 18[e] | 98.2 | 1.0 | 0.8 | 0.0 | 4.8 | 0.85 | 59 |
| 19[e] | 18.8 | 1.0 | 0.8 | 79.4 | 8.4 | 0.21[f] | 60 |

[a]Mol % chloromethylstyrenes (70/30 m/p), divinylbenzenes (55% technical grade), ethylvinylbenzenes, and styrene in the monomer mixture.
[b]Degree of functionalization, the fraction of polystyrene rings substituted with quaternary ammonium groups.
[c]Number average particle diameters of Co(II) latexes.
[d]polymerized in emulsion with sodium dodecyl sulfate. Conversion of chloromethyl to quaternary ammonium ions gives the colloid net positive charge.
[e]Polymerized in emulsion with hexadecyltrimethammonium bromide.
[f]Complete conversion to ammonium ions within error of measurement.

EXAMPLE 20

This example gives a general procedure for the autoxidation of 2,6-di-tert-butylphenol (DBP) using the ion exchange latexes containing CoPcTs as catalysts. In a typical experiment, the latex (123 mg) and a solution of CoPcTs (0.060 mmol in 10–30 ml) was mixed and sonicated for 0.5 hours. The catalyst was not protected from air. Then sodium borate (4.8 mmol) or AMPSO (4.4 mmol, obtained from Sigma Chemical Co., see Table 6) buffer was added and the pH was adjusted to 9.0. The catalyst syspension was charged in a 250 or 500 ml single neck round-botton (with a side arm) flask equipped with a condenser attached to a gas buret. DBP was either added to the flask at room temperature or injected after the temperature of catalyst suspension reached the desired reaction temperature. Two methods were used for addition of the DBP at room temperature. Addition of a solution of DBP in mthanol gave droplets containing DBP dispersed in 0.1 volume fraction methanol in water. Addition of solid DBP to a mixture of catalyst in water followed by heating at 70° C. gave fine droplets of melted DBP dispersed in water. Injection of DBP was done with a solution in methanol. After the gas buret was sealed to the flask, the apparatus was evacuated and filled with dioxygen 5 times. At about 0.9 atm dioxygen pressure the flask was placed in a thermostated oil bath at 70° C. Some reaction mixtures were stirred rapidly with a magnetic bar. Others were shaken with a platform shaker having an amplitude of 2.5 cm and a frequency of about 1 s$^{-1}$. The volume of reacted dioxygen was measured with the gas buret. After the reaction was over, the flask was separated from the system quickly, evacuated using a vacuum pump, and returned to atmospheric pressure with argon gas. The reaction mixture was acidified to pH 2-3 with $^1$M HCl, and organic components were extracted from the aqueous phase using dichloromethane and diethyl ether by first swelling the latex with 10–20 ml of dichloromethane and then shrinking it with diethylether, expelling solvents from the latex. The extraction process was repeated at least 3 times. The extracted organic phase was dried with anhydrous magnesium sulfate and concentrated to a small volume. The product mixture was analyzed quantitatively for DBP, 3,5,3',5'-tetra-tert-butyl-4,4'-diphenoquinone (DPQ), and 2,6-di-tert-butyl-1,4-benzoquinone (DBQ) by GLC analysis using hexadecane as internal standard. With all colloidal CoPcTs catalysts except the latex of Example 19 the only product was DPQ, which accounted for between 90% and 100% of the starting DBP. Experimental results with the latex catalyst of Example 15 are in Table 6 alone with results obtained with CoPcTsNa4 as catalyst in the absence of ion exchange latex. Further experimental results with the latex catalysts of Examples 15–19 in Table 7 show the effects of pH and temperature on the autoxidation of DBP.

TABLE 6

Autoxidation of 2,6-Di-tert-butylphenol (DBP) with CoPcTs Latexes 15 as Catalyst[a]

| latex example[d] | methanol vol. fr. | mixing method | time hours | % conv.[b] |
|---|---|---|---|---|
| soluble | 0.0 | shaking | 24 | 35[c] |
| soluble | 0.1 | shaking | 24 | 66[c] |
| 15 | 0.0 | shaking | 24 | 100 |
| 15 | 0.0 | stirring | 6 | 60 |
| soluble | 0.0 | stirring | 6 | 6 |
| soluble | 0.1 | stirring | 6 | 45 |
| soluble | 0.1 | shaking | 6 | 30 |
| 15 | 0.1 | stirring | 6 | 100 |
| 15 | 0.0 | shaking | 6 | 100 |

[a]All experiments were at 70.0° C. with 1.2 mmol of DBP, 6.04 × 10$^{-2}$ mmol (5.0 mol %) of CoPcTs, pH 9.0–9.1 adjusted with 4.4 mmol of AMPSO [2-hydroxy-3-[(2-hydroxy-1,1-dimethylethyl)amino]-1-propanesulfonic acid] buffer. All reaction mixtures had a volume of 150 ml and were carried out at ca. 700 mmHg (ca. 40 mmHg less than atmospheric) pressure of dioxygen.
[b]Percent of DBP consumed according to GC analysis.
[c]3–4% yield of DBQ was found in addition to DPQ.
[d]Soluble catalyst was cobalt phthalocyaninetetra(sodium sulfonate).

TABLE 7 pH and Temperature Dependences of Oxidation of DBP Using CoPcTs Latex Catalyst[a]

| latex example | pH | temp. °C. | time minutes | % conv. |
|---|---|---|---|---|
| 15 | 9.0 | 70 | 120 | 100 |
| 15 | 9.0 | 24 | 120 | 16 |
| 15 | 9.0 | 70 | 80 | 79 |
| 15 | 9.0 | 50 | 120 | 50 |
| 15[b] | 7.0 | 70 | 80 | 17 |
| 15[c] | 9.0 | 70 | 120 | 55 |
| 15[d] | 8.0 | 70 | 120 | 31 |
| 15[e] | 10.0 | 70 | 80 | 100 |
| 16 | 9.0 | 70 | 80 | 83 |
| 17 | 9.0 | 70 | 80 | 77 |
| 18 | 9.0 | 70 | 80 | 92 |
| 19[f] | 9.0 | 70 | 80 | 87 |

[a]All experiments used 0.1 volume fraction methanol, mechanical shaking, and the conditions reported in Table 6 unless noted otherwise.
[b]Buffer was ACES[2-[(2-amino-2-oxoethyl)amino]-ethanefulfonic acid].
[c]Reaction was run under air with a partial pressure of dioxygen of 150 mmHg.
[d]Buffer was TAPS [3-[2-hydroxy-1,1-bis(hydroxymethyl)ethyl]-1-propanesulfonic acid].
[e]Buffer was CAPS [3-(cyclohexylamino)-1-propanesulfonic acid].
[f]Mixture contained 243 mg of the latex of example 16, instead of 123–134 mg of colloidal particles as in other experiments.
All reaction mixtures contained 5 mol % Co based on DBP.

EXAMPLE 21

An 83 mg sample of the coagulated latex of Example 15 was redispersed in 25 ml of water in a 250-ml round bottom flask, and a solution of 4.076×10$^{-2}$ mmol of CoPcTsNa4 was added while sonicating. The pH of this dispersion was 5.0. A 100 mg sample of 2,6-dimethylphenol was added to the mixture. The overall pH of this mixture was adjusted to 9.0 with KOH solution. The gas buret was used to monitor the oxidation reaction. The mixture in the flask was stirred and heated with an 80.0° C. oil bath. After 45 hours 18.75 ml of dioxygen had been consumed, and there was a red-brown precipitate. Afte cooling the reaction mixture was filtered by using a Buchner funnel. The water insoluble material on filter paper was dissolved in chloroform. Evaporation left a red-brown residue of 47.9 mg which was identified as 3,5,3',5'-tetramethyl-4,4'-diphenoquinone from its IR and $^1$H NMR spectra and its melting point. The aqueous filtrate was extracted with dichloromethane, and the organic phase was dried and distilled carefully using a fractionating column. The residue contained 2,6-dimethylphenol, 2,6-dimethyl-1,4-benzoquinone, and 3,5,3',5'-tetramethyl-4,4'diphenoquinone and minor impurities according to $^1$H NMR analysis.

EXAMPLE 22

This example describes the preparation of the polymerizable surfactant 4-styrylmethyl(hexadecyl)dimethylammonium chloride which is used to prepare latexes with no dissociable surfactant.

In a 100 ml flask commercial vinylbenzyl chloride (3.05 g, 0.020 mol) was mixed with hexadecyldimethylamine (5.4 g, 0.020 mol) without any additional solvent. After addition of 2,6-di-tert-butyl-4-methylphenol (100 mg, 0.45 mmol) the mixture was heated overnight at 50° C. The solid product which formed was washed several times with dry ether, dried under vacuum at room temperature, and recrystallized from acetone/ether to give 6.3 g (75%) of 4-styrylmethyl (hexadecyl)dimethylammonium chloride. $^1$H NMR (CDCl$_3$/Me$_4$Si): 0.88 (s, 3H), 1.24 (br s, 26H ), 1.78 (s, 2H), 3.30 (s, 6H), 3.53 (s, 2H), 5.08 (s, 2H), 5.32 (d, J=10.8 Hz, 1H), 5.84(d, J=18 Hz, 1H), 6.7 m, 1H), 7.51 (m, 4H). IR (KBr); 3020, 2920, 1640 cm$^{-1}$. The critical micelle concentration (CMC) was $1.28 \times 10^{-2}$ M at 25° C. determined conductometrically.

EXAMPLE 23

This example describes the preparation of 12-(4styryloxy)dodecyltrimethylammonium bromide, a polymerizable surfactant that is used to prepare latexes with no dissociable surfactant.

A 500-ml three-neck flask was charged with potassium carbonate (27.6 g, 0.200 mol), 1,12-dibromododecane (36.1 g, 0.110 mol), β-hydroxystyrene (12.0 g, 0.100 mol), hydroquinone (0.25 g, 0.0023 mol) and 100 ml of acetone. The mixture was heated for 48 hours at 60° C. After cooling potassium bromide and potassium carbonate were separated from the reaction mixture by filtration and acetone was evaporated. Column chromatography using 250 g of 40 micrometer flash chromatography grade silica gel and petroleum ether containing 10% toluene as eluant was employed to separate the product, 12-bromododecyl 4-styryl ether (22%, mp 57–58° C.). $^1$H NMR(CDCl$_3$): ppm 1.30 (m, 16H), 1.84 (m, 4H), 3.39 (t, J=7 Hz, 2H),3.97 (t,J=6.6 Hz,2H),5.11 (d,J=10.8 Hz, 1H),5.59 (d,J=17.6 Hz, 1H), 6.65 (dd, J=11 Hz, 17.4 Hz, 1H), 6.85 (d, J=8.7 Hz, 2H), 7.33 (d,J=8.7 Hz, 2H). IR (KBr): 1630, 1250 cm$^{-1}$.

12-Bromododecyl 4-styryl ether (2 g, 0.0055 mol) and 30 ml of dichloromethane were placed in a 100 ml 3-neck flask fitted with a dry ice condenser. Trimethylamine (0.6 g, 0.010 mol) in 15 ml of acetone was added. The reaction mixture was held under argon, and during 20 hours at room temperature a white solid precipitated. Excess trimethylamine and solvents were removed under vacuum. The resultant solid was washed several times with dry ether and recrystallized from dichloromethane/acetone to give 2.1 g of 12-(4-styryloxy) dodecyltrimethylammonium bromide (90%). $^1$H NMR (CDCl$_3$/Me$_4$Si): ppm 1.3 (m, 16H), 3.45 (s, 9H), 3.55 (t, 2H), 3.95 (t, J=6.6 Hz, 2H), 5.11 (d, J=10.8 Hz, 1H), 5.6 (d, J=17.6 Hz, 1H), 6.65 (dd, J=11 Hz, 17.6 Hz, 1H), 6.85 (d, J=8.7 Hz, 2H), 7.32 (d, J=8.7 Hz, 2H). IR (Kbr): 1630, 1250 cm$^{-1}$. The CMC was determined conductometrically to be $3.6 \times 10^{-2}$ M at 45° C.

EXAMPLES 24–26

Latexes were prepared using the polymerizable surfactants of Examples 22 and 23 and using the bromide salt of (octadecyldimethylammonio)ethyl methacrylate by the following general procedure. The examples prepared and their properties are listed in Table 8. A mixture of 10.06 g of styrene, 0.843 g of monomeric surfactant of Example 22, 0.130 g of divinylbenzene (DVB, 55 wt % ), and 100.5 g of deionized water in a three-neck flask fitted with a condenser was stirred magnetically under argon for 20 minutes. The mixture was degassed with bubbling argon for 15 minutes and azobisisobutyronitrile (AIBN, 0.5% wt of total monomers) was added. The mixture was stirred and heated to 65° C. for 20 hours and 80° C. for 2 hours. The cool mixture was filtered through cotton to remove a trace (less than 0.1 g) of coagulum. The latex was purified by ultrafiltration through a 0.1 micrometer cellulose acetate/nitrate membrane (Millipore) under 60 psig pressure of nitrogen. The conductivity of the initial filtrate was $25-30\times10^{-6}$ ohm$^{-1}$ cm$^{-1}$. The latex was washed with water until the conductivity of the filtrate was $6-8\times10^{-6}$ ohm$^{-1}$ cm$^1$. The washed latex contained 6% of polymeric solids. Its bromide ion content was determined by the Volhard titration method. IR analysis of a coagulated sample showed no detectable band at 1630–1640 cm$^{-1}$ for the carbon-carbon double bond stretch of the monomer. The number average particle diameter was determined by measurement of fifty particles on a transmission electron micrograph of a sample that was stained with uranyl acetate.

TABLE 8

| | Recipes and Results of Emulsion Polymerizations of EXAMPLES 24–26 | | | | | | |
|---|---|---|---|---|---|---|---|
| Latex example | Styrene g | DVB g | EVB g | Surfactant g | AIBN g | Br$^-$ meg/g$^a$ | $d_n^b$ nm |
| 24$^c$ | 30.264 | 0.391 | 0.320 | 2.940 | 0.168 | 0.174 | 58 |
| 25$^d$ | 10.08 | 0.130 | 0.106 | 0.843 | 0.055 | 0.173 | 64 |
| 26$^e$ | 10.08 | 0.130 | 0.106 | 0.852 | 0.055 | 0.179 | 58 |

$^a$Determined by volhard titration.
$^b$Number average particle diameter measured form transmission electron micrographs.
$^c$Prepared from the bromide salt of 2-(hexadecyldimethylammonio)ethyl methacrylate.
$^d$Prepared from 4-styryllmethyl(hexadecyl)dimethammonium chloride (example 22).
$^e$Prepared from 12-(4-styryloxy)dodecyltrimethylammonium bromide (example 23).

EXAMPLE 27

This example describes a general procedure for the autoxidation of 1-decanethiol with CoPcTs bound to latexes as catalysts. The active catalysts were prepared by addition of aqueous CoPcTsNa$_4$ to the latexes of Examples 24–26. Each catalyst was ultrafiltered through a 0.1 micrometer membrane. No blue CoPcTs could be seen in the filtrate. The oxidations of 1-decanethiol were performed in a vigorously mixed aqueous suspension charged in 250 ml round bottom flask fitted with a side arm and condenser attached to a gas buret. The desired pH was adjusted using borate buffer. All experiments were carried out at 35° C. and at constant dioxygen pressure with magnetic stirring of 105 ml of reaction mixture. The catalyst suspension was held in air 15 minutes, and then degassed three times and saturated with oxygen while stirring. The catalyst mixture was held under oxygen 10 minutes before addition of thiol. 1-Decanethiol was added to reaction flask using a syringe. The consumption of dioxygen was followed with the gas buret. After completion of the reaction the mixture was extracted with hexane, and the extract was analyzed by gas chromatography for unreacted 1-decanethiol and by thin layer chromatography. The major product of the reaction was di-1-decyldisulfide, which was identified by comparison of its thin layer chromatographic behavior with that of an authentic sample. Results of the autoxidations of 1-decanethiol are listed in Table 9.

TABLE 9

Autoxidation of 1-Decanethiol with Latex CoPcTs Catalyst[a]

| catalyst prepared from latex of example | $R_4N^+$ mmol | CoPcTs mmol | 1-decane-thiol mmol | minutes for 50% reaction[b] |
| --- | --- | --- | --- | --- |
| CoPcTs | 0.0 | 0.0105 | 1.53 | 50 |
| 24 | 0.105 | 0.0 | 1.53 | 95 |
| 24 | 0.150 | 0.0105 | 1.53 | 6 |
| 25 | 0.105 | 0.0105 | 1.53 | 19 |
| 26 | 0.105 | 0.0105 | 1.53 | 4 |

[a]All experiments were carried out at 35.0° C., and dioxygen pressure of 720 mmHg with magnetic stirring of 105 ml of reaction mixture. The pH of all mixtures was adjusted at 9.0 using 4 ml of 0.0125 M sodium borate and HCl.
[b]Determined from volume of dioxygen consumed.

Having thus described the invention with a certain degree of particularity, it is to be understood that the invention is not limited to the embodiments set forth herein for purposes of exemplification, but is to be limited only by the scope of the attached claims, including a full range of equivalents to which each element thereof is entitled.

We claim:

1. Charged polymer latex particles of from about 0.01 to about 1.5 micrometers in diameter which contain from about 0.01 to about 3.0 millimoles of metal complex per gram of dry polymer, and wherein the polymer may be either uncrosslinked, or crosslinked with up to 25 mole percent of a polyfunctional monomer.

2. Charged polymer latex particles containing metal complex of claim 1 wherein the particles are negatively charged and the metal complex is a cation.

3. Charged polymer latex particles containing metal complex of claim 1 wherein the particles are positively charged and the metal complex is an anion.

4. Charged polymer latex particles containing metal complex of claim 1 wherein the polymer is a copolymer containing both ionic and neutral repeat units.

5. Charged polymer latex particles containing metal complex of claim 2 wherein the polymer comprises at least one polymerized monomer selected from the group consisting of: acrylic acid, methacrylic acid, 2-substituted acrylic acids and derivatives thereof; maleic acid, itaconic acid, vinylbenzoic acid and derivatives thereof; omega-acrylamidoalkanecarboxylic acids and derivatives thereof; salts ofstyrenesulfonate, 2-sulfoethyl methacrylate, methallylsulfonate or 2-acrylamido-2-methylpropanesulfonate; and vinyl monomers containing phosphonic acids, phosphate esters or derivatives thereof.

6. Charged polymer latex particles containing metal complex of claim 2 wherein the polymer comprises at least one polymerized monomer selected from the group consisting of: acrylic acid, methacrylic acid, sodium styrenesulfonate, sodium 2-acrylamido-2-methylpropanesulfonate and methyl styrenesulfonate.

7. Charged polymer latex particles containing metal complex of claim 3 wherein the polymer comprises at least one polymerized monomer selected from the group consisting of: vinylbenzyltrimethylammonium chloride, vinylbenzyl(octadecyl)dimethylammonium chloride, ortho-12-styryloxydodecyltrimethylammonium chloride, para-12-styryloxydodecyltrimethylammoniumchloride, and the quaternary ammonium bromide formed from 1-bromohexadecane and dimethylaminoethyl methacrylate; polymerizable vinyl monomer containing a quaternary ammonium, quaternary phosphonium or quaternary arsonium ion; and polymerizable vinyl monomer containing an amine.

8. Charged polymer latex particles containing metal complex of claim 1 wherein the metal of said complex is selected from the group consisting of titanium, vanadium, chromium, manganese, iron, cobalt, nickel, copper, zinc, zirconium, niobium, molybdenum, ruthenium, rhodium, palladium, silver, cadmium, indium, tin, tungsten, rhenium, osmium, iridium, platinum, gold, mercury, thallium and lead.

* * * * *